(12) United States Patent
Petin et al.

(10) Patent No.: US 6,550,367 B2
(45) Date of Patent: Apr. 22, 2003

(54) AIRVALVE ASSEMBLY FOR A BRAKE BOOSTER

(75) Inventors: Bernard Petin, Dayton, OH (US); Michael A. Kasselman, Westchester, OH (US); Patrick T. Maclellan, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/839,351

(22) Filed: Apr. 20, 2001

(65) Prior Publication Data

US 2002/0152884 A1 Oct. 24, 2002

(51) Int. Cl.$^7$ .................................................. F15B 9/10
(52) U.S. Cl. ........................................................ 91/369.3
(58) Field of Search ............................... 91/369.2, 369.3

(56) References Cited

U.S. PATENT DOCUMENTS

| | | | |
|---|---|---|---|
| 5,699,713 A | 12/1997 | Mortimer | 91/369.2 |
| 5,884,548 A | 3/1999 | Ando et al. | 91/369.2 |
| 5,893,316 A | 4/1999 | Inoue et al. | 91/369.2 |

*Primary Examiner*—F. Daniel Lopez
(74) *Attorney, Agent, or Firm*—Scott A. McBain

(57) ABSTRACT

An airvalve assembly for a brake booster includes first and second members movable relative to each other to allow the passage of fluid, and a clip. The clip engages one of the first or second members, and has a spring arm which engages the other of the first or second members to normally position the first and second members relative to each other.

17 Claims, 4 Drawing Sheets

AIRVALVE ASSEMBLY FOR A BRAKE BOOSTER

TECHNICAL FIELD OF THE INVENTION

This invention relates to brake boosters for use in a braking system, and more particularly to an airvalve assembly for a brake booster.

BACKGROUND OF THE INVENTION

The use of a brake booster in a braking system is well known. The brake booster typically comprises front and rear housing parts which are joined around their outer peripheral edge, a flexible diaphragm secured inside the housing to define front and rear chambers within the housing, and an input member which allows relatively high pressure fluid to enter one of the chambers and boost the output braking force.

In general, such designs provide a constant boost ratio throughout their operating range. However, systems have also been proposed to obtain more than one ratio. U.S. Pat. No. 5,699,713, for example, shows a brake booster having a spring arranged to yield under a predetermined force to change the ratio of operative surface areas and thereby increase the boost ratio. U.S. Pat. No. 5,884,548 teaches a brake booster in which an adjusting mechanism is compressible so as to develop a greater degree of pressure differential when a force applied by an input rod exceeds a predetermined level. U.S. Pat. No. 5,893,316 discloses a brake booster that includes a spring that is compressed when a brake reaction exceeds a preset load, and a servo ratio can be established by the choice of areas of contact between a reaction disc and other components.

Often a large spring is required in these designs to achieve proper performance. When space is at a premium, such large springs are a disadvantage.

SUMMARY OF THE INVENTION

The present invention is an airvalve assembly for a brake booster of a motor vehicle. The airvalve assembly comprises first and second members movable relative to each other to allow the passage of fluid, and a clip. The clip engages one of the first or second members, and has a spring arm which engages the other of the first or second members to normally position the first and second members relative to each other.

An object of the present invention is to provide an airvalve assembly of the type described above which is relatively compact for the performance achieved.

Another object of the present invention is to provide an airvalve assembly of the type described above in which the clip performs the functions of locating at least a portion of the airvalve assembly and providing a preloaded spring force.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE INVENTION

Figure 1:
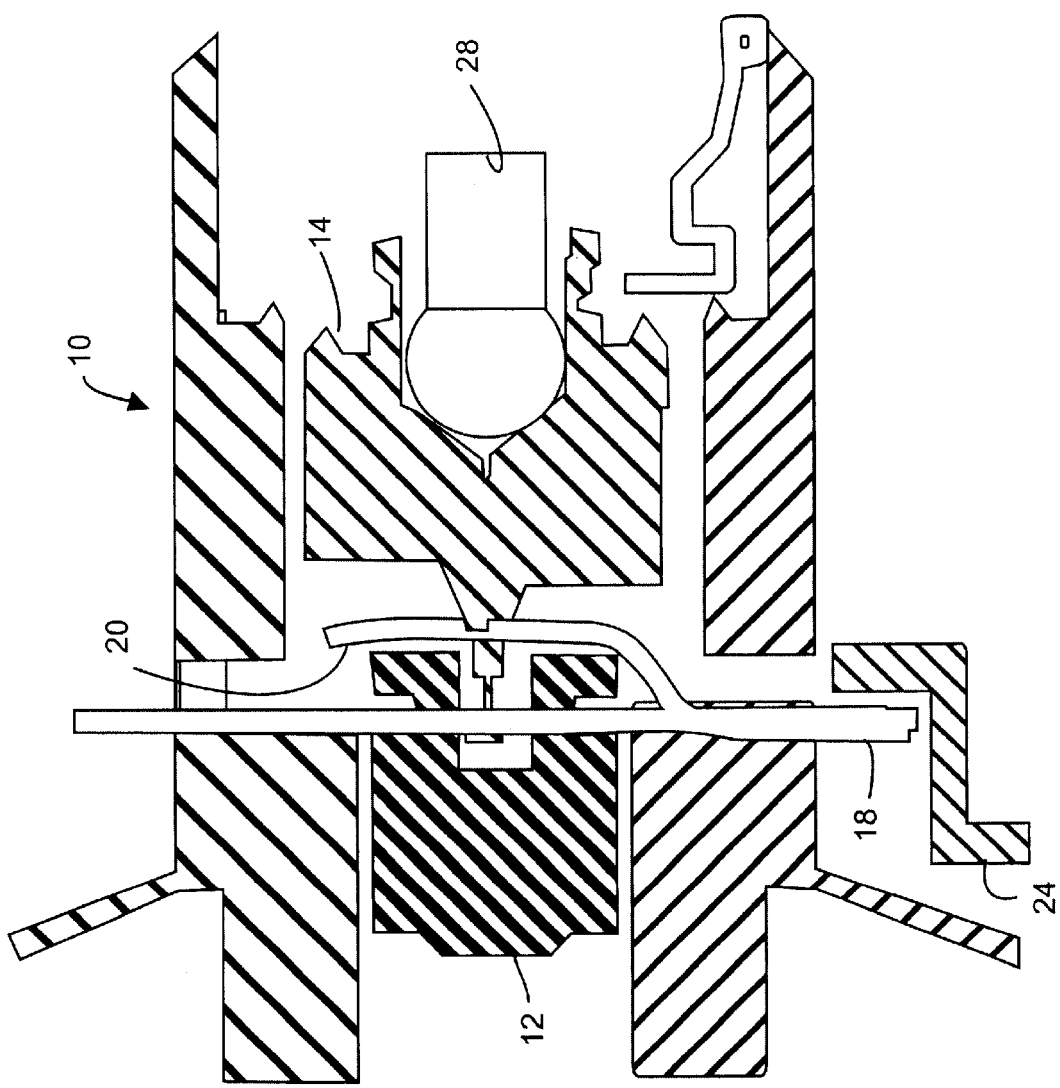
FIG. 1 is a schematic cross-sectional view of an airvalve assembly according to the present invention for a brake booster of a motor vehicle.

FIG. 1 shows an airvalve assembly 10 according to the present invention for a vacuum brake booster of a motor vehicle. As is conventional, the airvalve assembly 10 comprises a first member or plunger 12 and a second member or airvalve 14. The plunger 12 and the airvalve 14 are movable relative to each other to allow the passage of a fluid such as air into a boost assist chamber. A pressure differential is thereby established in the brake booster in order to magnify the force available to brake the vehicle, as is well known.

Figure 2:
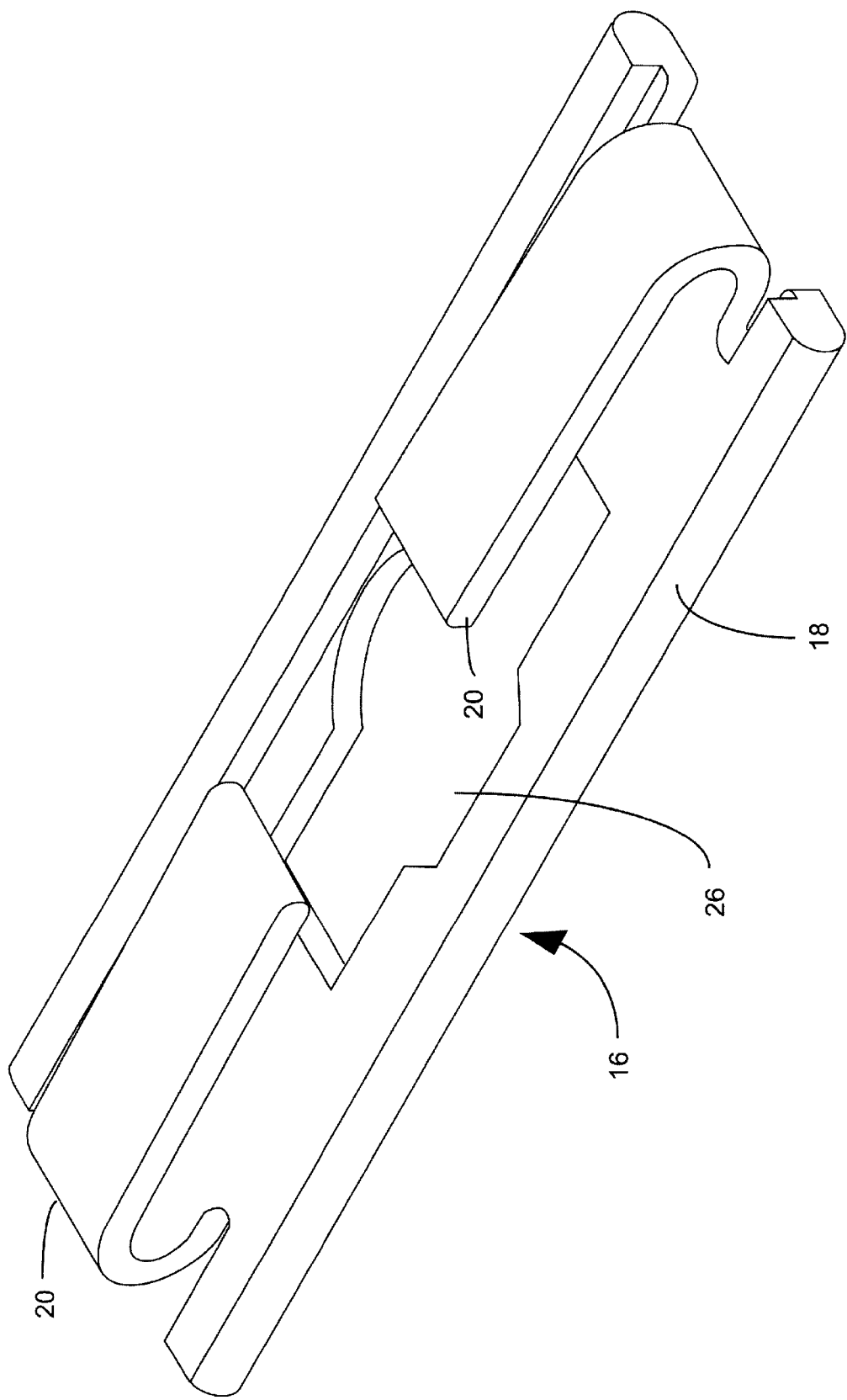
FIG. 2 is a perspective view of a clip for use in the airvalve assembly.

A spring clip 16, preferably formed as a unitary piece, is shown separately in FIG. 2. The clip 16 includes a base 18 and one or more cantilevered arms 20. The base 18 of the spring clip can be mounted to a housing 24 of the airvalve assembly, and is laterally translatable therein for a short distance as the brake pedal of the vehicle is initially depressed. The clip 16 also includes a cutout region 26 that surrounds a notched portion of the plunger 12 to locate the plunger within the housing. The arms 20 extend inwardly toward the cutout region 26, and their distal ends engage the airvalve 14 to normally position the plunger and the airvalve relative to each other. It should be appreciated, of course, that the orientation of the spring clip 16 could be reversed such that the arms 20 instead engage the plunger 12.

When the operator of the motor vehicle depresses the brake pedal, an input shaft 28 moves to the left as shown in FIG. 1 and likewise forces second member 14 toward the left. At forces below a certain magnitude, the spring arms 20 can be essentially immovable relative to the clip base 18. At such low braking levels, the plunger 12 therefore simply translates to the left for a distance equivalent to the distance traveled by the airvalve 14, and into engagement with a reaction disk. The brake booster thus obtains a first ratio when the application of force is below the certain magnitude. When the input braking force exceeds that magnitude, equal to the preload of the spring arms 20, the arms can collapse. As is known in the art, a second ratio can then be obtained.

Figure 3:
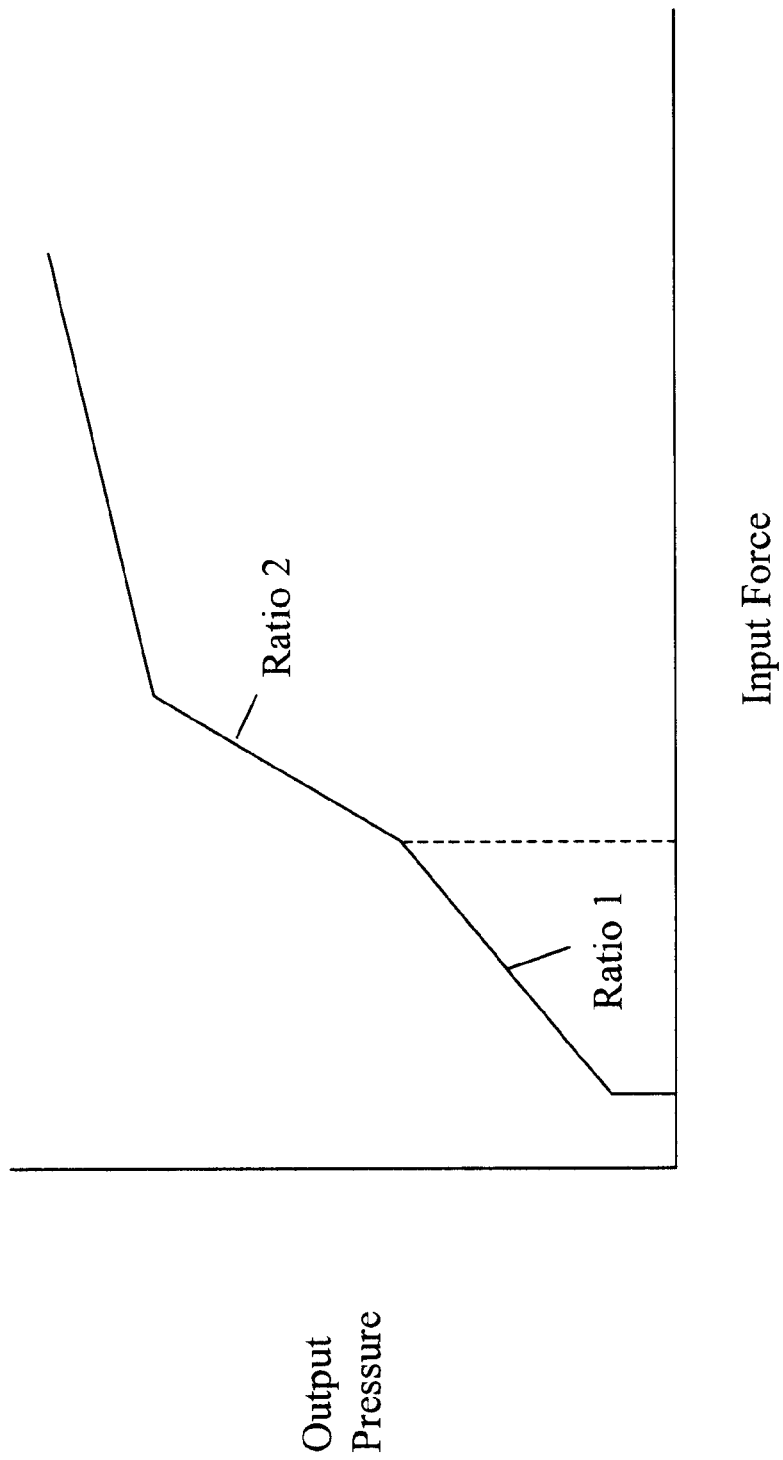
FIG. 3 is a graph of output obtained by the present invention as a function of the input.

FIG. 3 shows a graph of the output as a function of the input force for a preferred embodiment of the present invention. Below a predetermined force, the booster operates at the first ratio. Beyond this point, the brake booster obtains a second, preferably greater but still generally constant ratio. At near maximum output pressures, the curve flattens to reflect a run-out position or condition of the booster, which can operate at a 1:1 ratio.

Figure 4:
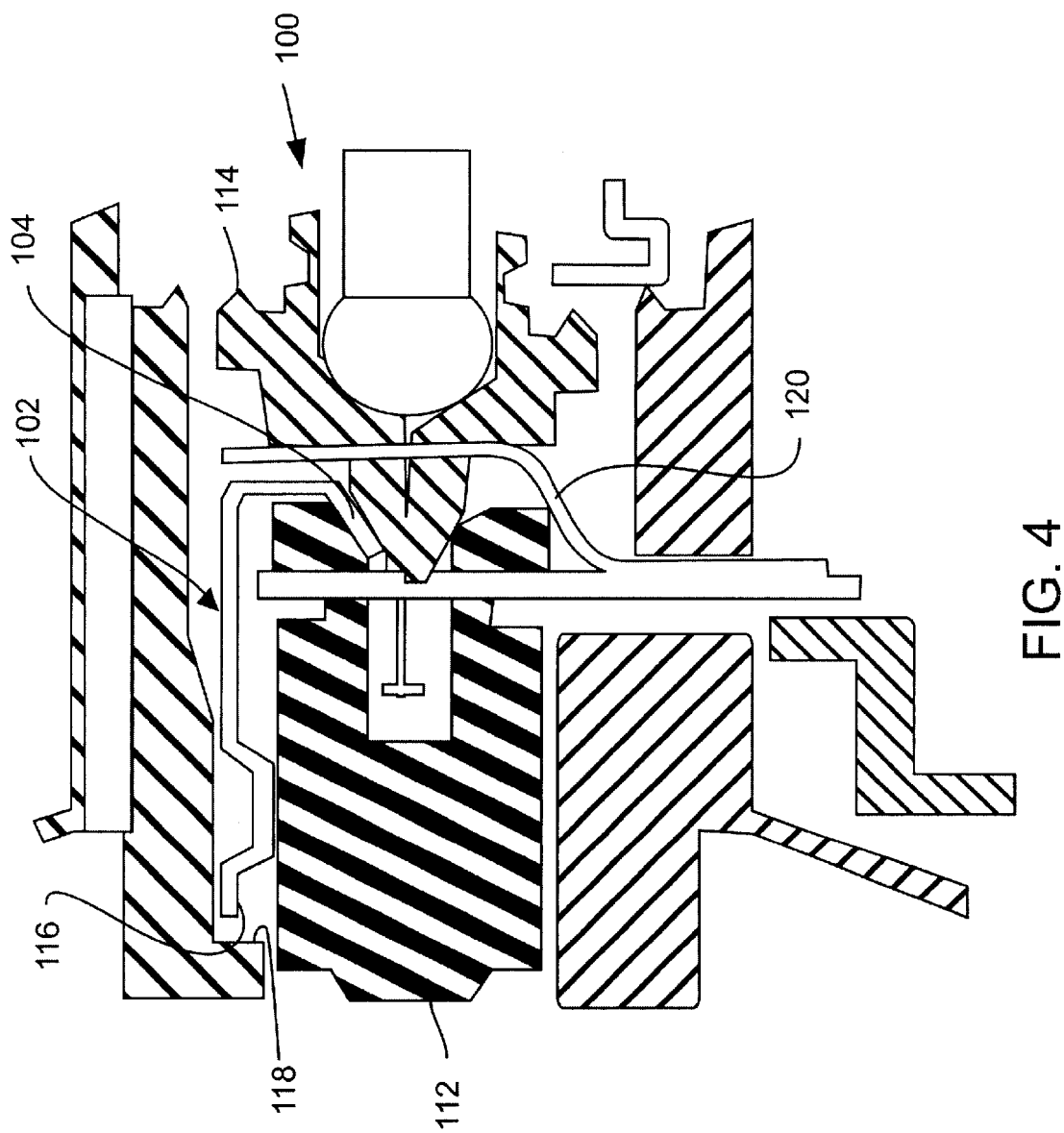
FIG. 4 is a schematic cross-sectional view of an alternative embodiment of the airvalve assembly.

FIG. 4 shows an alternative embodiment 100 of the airvalve assembly of the present invention. In this embodiment, a clip 102 has an extension 104 that is initially interposed between ramped surfaces of the plunger 112 and the airvalve 114. Upon application of braking force, the clip 102 translates to the left as shown in the figure, until a distal end 116 of the clip 102 abuts a shoulder 118. Further translation of the airvalve assembly can cause the extension 104 of the clip 102 to move out from between the plunger 112 and the airvalve 114, allowing the airvalve assembly to collapse subject only to the preload of the spring arm 120. The spring arm 120 may be selected with a relatively low preload such that it provides no impediment to collapse of the airvalve assembly, but instead functions to return the plunger and airvalve to their original relative positions upon reduction of the braking force.

The above-described implementations of this invention are example implementations. Moreover, various other improvements and modifications to this invention may occur to those skilled in the art and those improvements and modifications will fall within the scope of this invention as set forth below.

What is claimed is:

1. An airvalve assembly for a brake booster comprising:

first and second members movable relative to each other; and a clip engaging one of the first or second members, the clip having a spring arm which engages only the other of the first or second members to normally position the first and second members relative to each other;

only one of the first and second members being engagable with a reaction disk.

2. The airvalve assembly of claim 1 wherein the spring arm is essentially immovable relative to the clip upon the application of force below a certain magnitude.

3. The airvalve assembly of claim 2 wherein the brake booster obtains a first ratio when the application of force is below the certain magnitude.

4. The airvalve assembly of claim 2 wherein the brake booster obtains a first, relatively constant ratio while the application of force is between zero and the certain magnitude.

5. The airvalve assembly of claim 2 wherein the brake booster obtains a second ratio when the application of force is above the certain magnitude.

6. The airvalve assembly of claim 2 wherein the brake booster obtains a second, relatively constant ratio while the application of force is above the certain magnitude.

7. The airvalve assembly of claim 2 wherein the brake booster obtains a first ratio when the application of force is below the certain magnitude, and the brake booster obtains a second ratio when the application of force is above the certain magnitude, the second ratio being greater than the first ratio.

8. The airvalve assembly of claim 7 wherein the first ratio is relatively constant while the application of force is between zero and the certain magnitude.

9. The airvalve assembly of claim 7 wherein the second ratio is relatively constant while the application of force is above the certain magnitude.

10. An airvalve assembly for a brake booster comprising:

first and second members movable relative to each other; and a clip engaging one of the first or second members, the clip having a spring arm which engages only the other of the first or second members to normally position the first and second members relative to each other, the spring arm being essentially immovable relative to the clip upon the application of force below a certain magnitude;

the brake booster obtaining a first ratio when the application of force is below the certain magnitude and a second ratio when the application of force is above the certain magnitude;

only one of the first and second members being engagable with a reaction disk.

11. The airvalve assembly of claim 10 wherein the second ratio is a relatively constant ratio while the application of force is above the certain magnitude.

12. The airvalve assembly of claim 10 wherein the first ratio is a relatively constant ratio while the application of force is between zero and the certain magnitude.

13. The airvalve assembly of claim 10 wherein the second ratio is greater than the first ratio.

14. The airvalve assembly of claim 13 wherein the first ratio is relatively constant while the application of force is between zero and the certain magnitude.

15. The airvalve assembly of claim 13 wherein the second ratio is relatively constant while the application of force is above the certain magnitude.

16. An airvalve assembly for a brake booster comprising:

first and second members movable relative to each other; and a clip engaging one of the first or second members, the clip having a spring arm which engages only the other of the first or second members to normally position the first and second members relative to each other, the spring arm being essentially immovable relative to the clip upon the application of force below a certain magnitude;

the brake booster obtaining a first, relatively constant ratio while the application of force is between zero and the certain magnitude, and a second, relatively constant ratio while the application of force is above the certain magnitude;

only one of the first and second members being engagable with a reaction disk.

17. The airvalve assembly of claim 16 wherein the second ratio is greater than the first ratio.

* * * * *